US012307259B2

(12) United States Patent
McMillan

(10) Patent No.: US 12,307,259 B2
(45) Date of Patent: May 20, 2025

(54) POWER MANAGEMENT SYSTEM

(71) Applicant: digitalVAR, Inc., Hayward, CA (US)

(72) Inventor: Connor McMillan, Fremont, CA (US)

(73) Assignee: digitalVAR, Inc., Hayward, CA (US)

( * ) Notice: Subject to any disclaimer, the term of this patent is extended or adjusted under 35 U.S.C. 154(b) by 133 days.

(21) Appl. No.: 18/471,607

(22) Filed: Sep. 21, 2023

(65) Prior Publication Data

US 2025/0103344 A1 Mar. 27, 2025

(51) Int. Cl.
*G06F 9/4401* (2018.01)
*G06F 1/26* (2006.01)

(52) U.S. Cl.
CPC .............. *G06F 9/4406* (2013.01); *G06F 1/26* (2013.01)

(58) Field of Classification Search
CPC ................................ G06F 9/4406; G06F 1/26
See application file for complete search history.

(56) References Cited

U.S. PATENT DOCUMENTS

2017/0177871 A1* 6/2017 Salomon ............... G06F 13/385
2018/0062815 A1* 3/2018 Mitchell ............. H04L 12/4625
2022/0066531 A1* 3/2022 Huang .................. G06F 1/1632

* cited by examiner

*Primary Examiner* — Terrell S Johnson
(74) *Attorney, Agent, or Firm* — Dergosits & Noah LLP; Igor Shoiket

(57) ABSTRACT

Disclosed are a method and apparatus in which a power management system automatically maintains a USB powered off while the booting of a computing device is incomplete and only supplies power to the USB hub after the OS boot has completed. This is accomplished by the power management system communicating with the computing device receiving a signal indicating the status of the OS boot. Based on the received signal, the power management system determines whether or not to signal a power relay to supply power to the USB hub.

20 Claims, 7 Drawing Sheets

POWER MANAGEMENT SYSTEM

BACKGROUND

Typically, when connecting a USB hub (a device with a plurality of USB ports) to a computing device, having the USB hub powered before the operating system (OS) has fully booted will result in the OS not recognizing the USB hub ports after boot has completed.

For example, some computers may recognize one or two USB hubs of 16 ports. However, when the number of USB ports is increased to a much larger number, perhaps 128, it is highly likely that most, if not all, computers will fail to recognize each endpoint, regardless of whether a USB device populates the port during boot or not.

Thus, what is needed is a system and method for delaying the supply of power to a USB hub until after the OS boot has completed.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

In embodiments, a power management system automatically maintains a USB powered off while the OS boot is incomplete and only supplies power to the USB hub after the OS boot has completed. This is accomplished by the power management system communicating with the computing device via, e.g., a USB com port, and receiving a signal indicating the status of the OS boot. Based on the received signal, the power management system determines whether or not to supply power to the USB hub.

Figure 1:
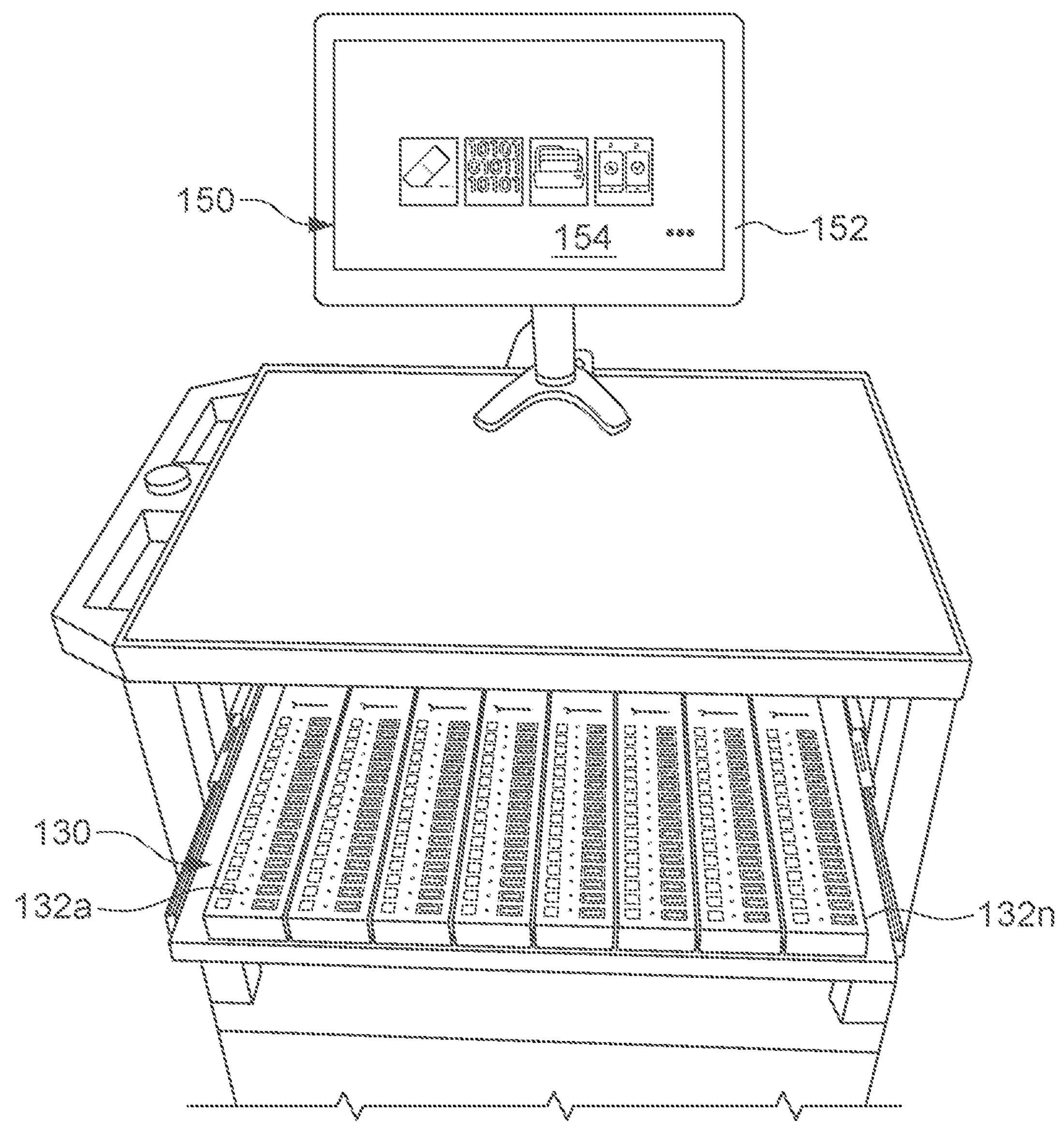
FIG. 1 is a perspective view of an embodiment of a power management system.

FIG. 1 is a perspective view of an embodiment of a power management system 100. In FIG. 1, power management system 100 includes a computing device 150, power relay unit 120 (FIG. 3), and a USB hub 130. A touchscreen display 152 of computing device 150 is showing a screenshot 154 of an interface for using USB hub 130. USB hub 130 includes a number of USB ports 132*a* . . . 132*n*. Each USB port 132*a* . . . 132*n* may be populated with a USB drive. Power management system 100 controls the power to USB hub 130, and as a result the power to each USB drive populating USB hub 130, based on the boot status of the OS of computing device 150.

Figure 2:
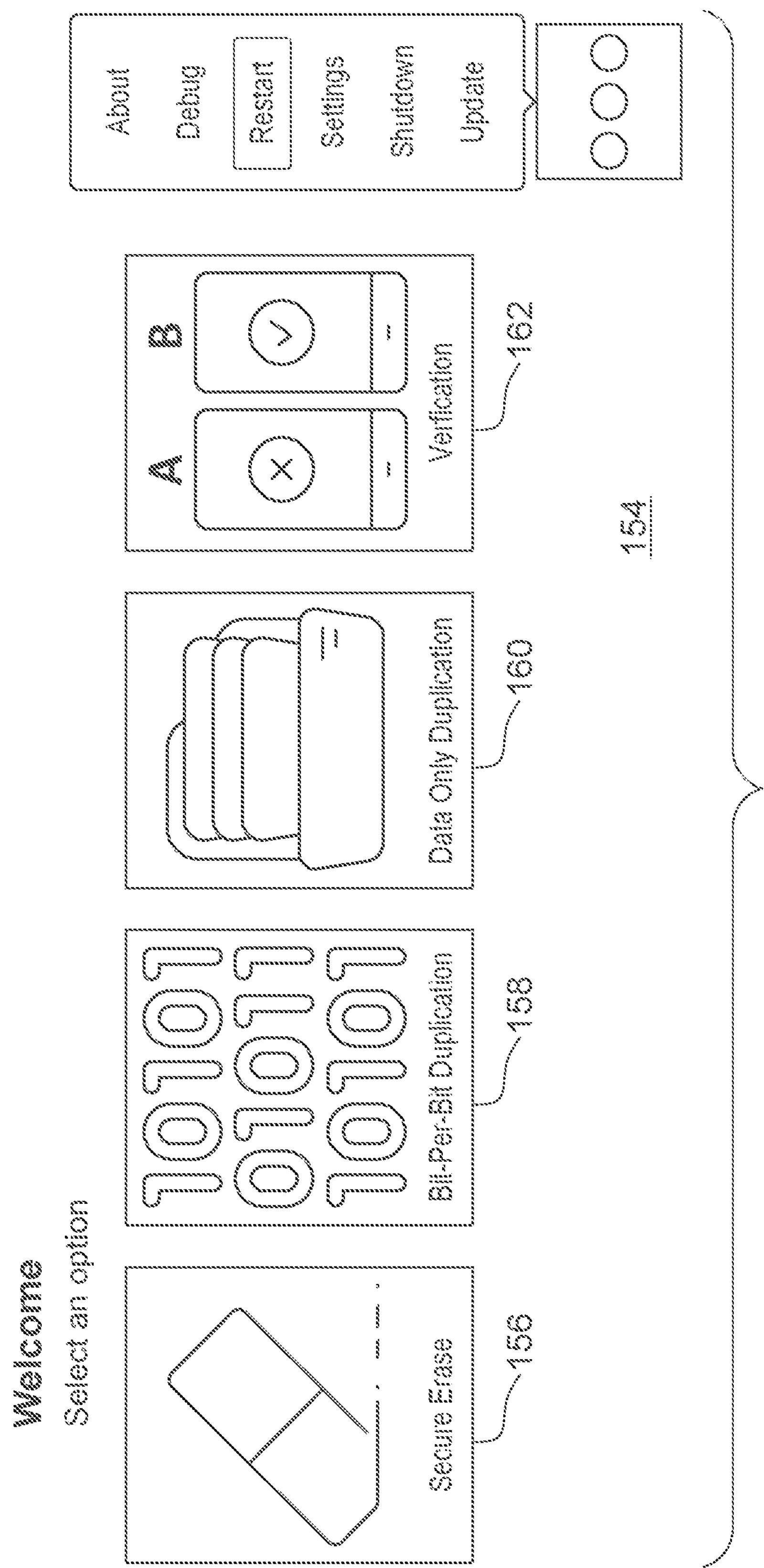
FIG. 2 is an illustration of a screenshot from an embodiment of a power management system.

FIG. 2 is an illustration of a screenshot 154 from an embodiment of a GUI for using USB hub 130. In FIG. 2, screenshot 154 indicates the GUI allows users to perform the following operations on USB devices in USB hub 130: Secure Erase 156; Bit-Per-Bit Duplication 158; Data Only Duplication 160; and Verification 162. Such operations require that computing device 150 properly recognizes each of USB device populating USB hub 130. Thus, in embodiments, power management system 100 delays providing power to USB hub 130 until the OS of computing device 130 has completed booting, which facilitates computing device 150 properly recognizing the USB devices in USB hub 130.

Figure 3:
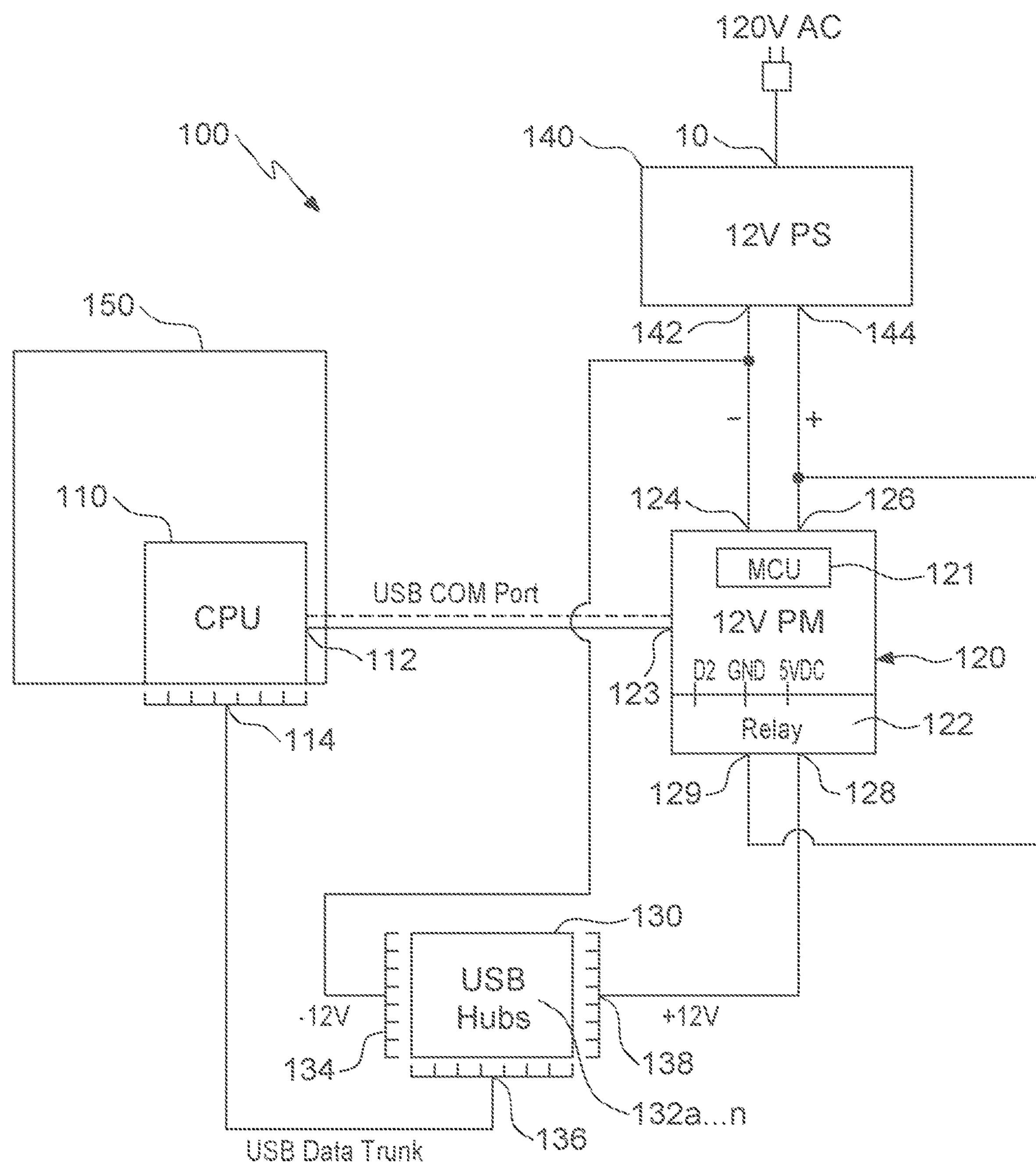
FIG. 3 is a partial circuit diagram of a power management system.

FIG. 3 is a partial circuit diagram of an embodiment of power management system 100. In FIG. 3, power management system 100 is shown to further include a power relay unit 120 and a 12 VDC power supply 140 receiving power from 120 VAC 10. Computing device 150 includes a CPU 110, with a USB com port 112 and USB data trunk connection 114. Power relay unit 120 includes a microcontroller 121 and a relay 122. Power relay unit 120 receives −12V at input 124, +12V at input 126, and communications with CPU 110 via a USB com port 123 (a type of signal connection). Relay 122, which is shown in the normal configuration, receives +12V at a source power input 129 (a type of source power connection). Normally open relay pin 128 (a type of power supply connection) is normally not supplied with +12V. However, when instructed by an MCU 121, relay 122 closes and supplies +12V to supply pin 128. When relay 122 closes, USB hub 130 receives +12V supply power at a hub power supply pin 138 (a type of power supply connection), USB hub 130 in turn distributes +5V to each USB port 132*a* . . . 132*n*. So long as 12 VDC power supply 140 is itself receiving power, USB bub 130 receives −12V at hub supply pin 134, distributing 5V to each USB port 132*a* . . . 132*n*. Each USB port 132*a* . . . 132*n* of USB hub 130 communicates with CPU 110 via USB data trunk pin 136. USB data trunk pin carries digital data signals, and does not supply the USB hubs with power. When USB hub 130 is not supplied with +12V, the OS and computer do not see USB ports 132*a* . . . 132*n*, since USB hub 130 relies on +12V from power relay unit 120 to function properly. This is unlike USB hubs where no additional power is needed because they run off the +5V from the USB port they are connected to.

In an embodiment, MCU 121 may include an Arduino Nano microcontroller.

Figure 4:
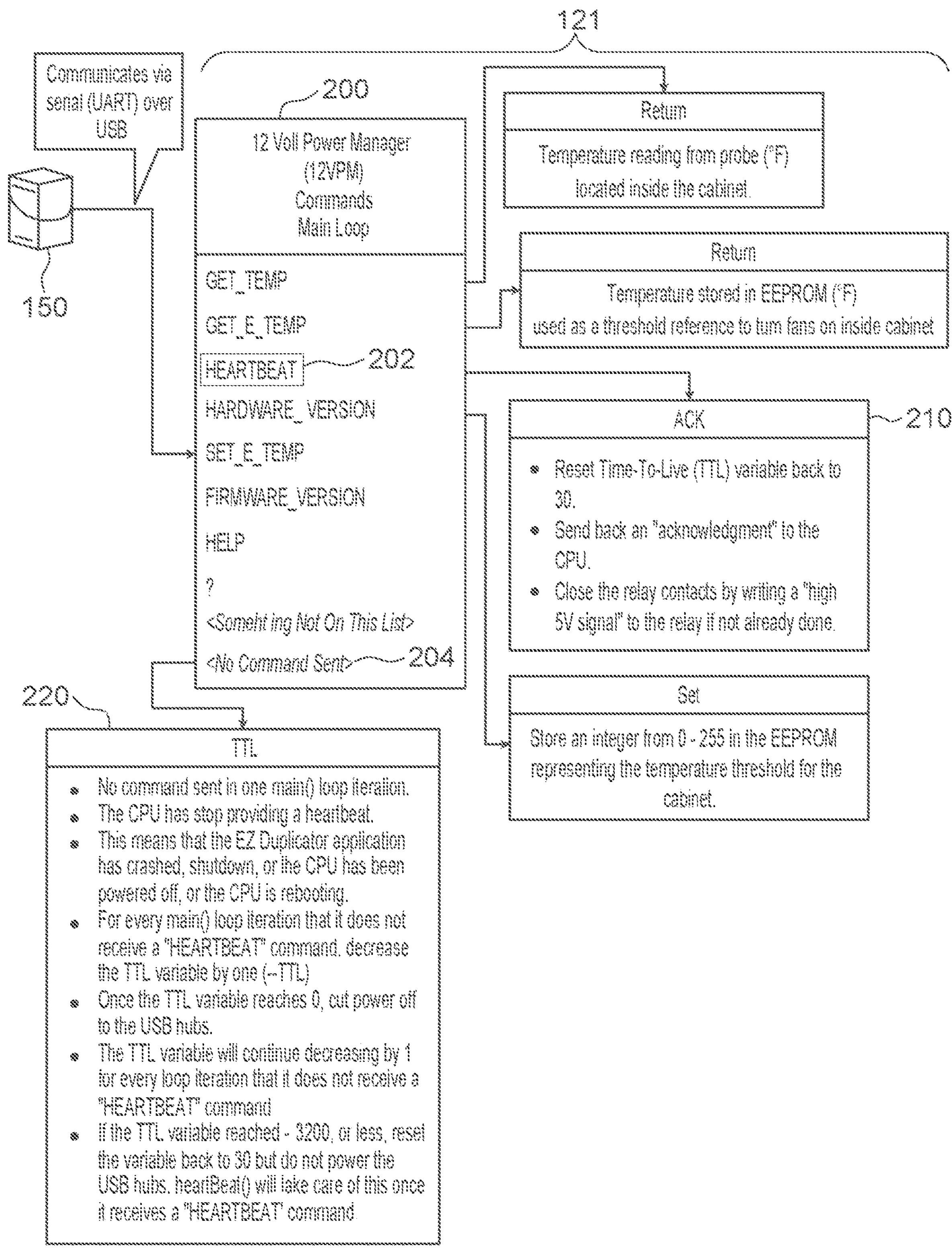
FIG. 4 is a schematic illustrating logical aspects of an embodiment of a power management system.

FIG. 4 is a schematic illustrating logical aspects of an embodiment of a power management system. In FIG. 4, MCU 121 receives input from computing device 150 initiated by CPU 110 (i.e., at USB com port pin 123, FIG. 2). Depending on the input received during each main loop iteration, i.e., commands called by CPU 110 and received in a buffer, MCU 121 may perform one or more of the routines in a 12V power manager commands main loop 200. A main loop iteration is a cycling through commands 200 by MCU 121. In cycling through commands 200, MCU 121 compares what is in the buffer that it received from the CPU 150 to the list of commands 200 until it finds a match. When a match is found, specific instructions associated with the command found are executed, e.g., ACK routine 210 is executed when a match to heartbeat 202 is found in the buffer received from CPU 150. This only applies when something is found in the buffer MCU 121 received from the CPU 150. When nothing is received in the buffer, a main loop iteration is shorter than when something is found and a routine executed in response. When MCU 121 receives a heartbeat command 202 in the main loop iteration, MCU 121 executes an ACK routine 210.

The sending of heartbeat command 202 is initiated by CPU 110 upon CPU 110 fully completing its boot cycle. ACK routine 210 includes: resetting a time-to-live (TTL) variable to 30; returning an "acknowledgement" to CPU 110 (of computing device 150); and closing the contacts of power relay 122 by writing a "high 5V signal" to power relay 122, i.e., providing a 5V signal to power relay 122, which causes relay 122 to close and supply +12V to pin 128 and to USB pin 138. When no command is received 204 in one main loop iteration, MCU 121 calls a TTL routine 220. The reasons for CPU 110 having stopped providing a heartbeat can include: the duplication application has crashed or shutdown, and CPU 110 has been powered off or is rebooting. TTL routine 220 then: decrements a TTL variable by one (−TTL). If TTL is then zero, USB hub 130 is powered down by MCU 121 stopping the 5V signal to power relay 122. For every main loop iteration during which no command is sent, TTL is decremented by 1 until TTL becomes −3200, at which point TTL is reset to 30. ACK routine 210 and TTL routine 220, in combination, work to supply a high 5V signal to power relay 122 and keep USB hub 130 powered when a heartbeat command is received in a loop iteration, and, when 30 loop iterations have passed without a heartbeat command has been received, stopping the supply of the high 5V signal and cutting power to USB hub 130. Thus, a feature of an embodiment of the power management system is that there is a logic mechanisms put in place so as not to cause power disruption during normal operation (e.g., ACK routine 210).

In ACK routine 210, the "acknowledgment" sent to CPU 110 may be a non-blank response. The response may be expected one second after the heartbeat is sent. If three or more heartbeats are sent in a row by CPU 110 without CPU 110 receiving an acknowledgment, then CPU 110 will instruct the GUI to issue an alert indicating that power management system 100 has ceased communication and advising that an operator perform a complete power cycle of all components.

In an embodiment, TTL routine 220 is called by MCU 121 when no heartbeat command is received in one main loop iteration. That is, another non-heartbeat command may be received by MCU 121 in a main loop iteration and MCU 121 will still call TTL routine 220.

Figure 5:
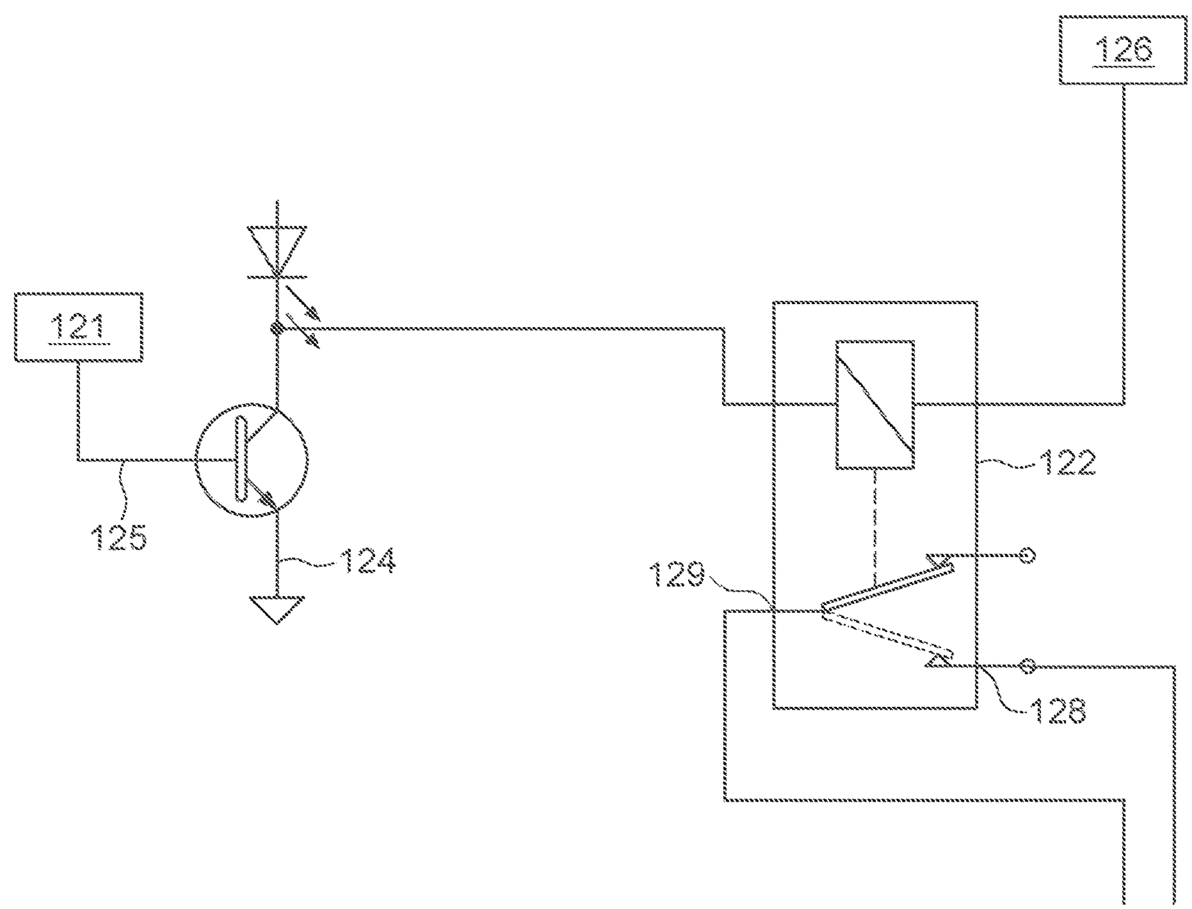
FIG. 5 is a partial circuit diagram of an embodiment of a power management system.

FIG. 5 is a partial circuit diagram of an embodiment of a power management system. In FIG. 5, power relay 122 is activated when MCU 121 provides a signal 125, i.e., the "high 5V signal" of ACK routine 210, to a control transistor Q1. As a result, power relay 122 cycles and normally open contact 128 is connected to +12V pin 129. This provides +12V to hub power supply pin 138, distributing +12V to each USB port 132*a* . . . 132*n*.

Figure 6:
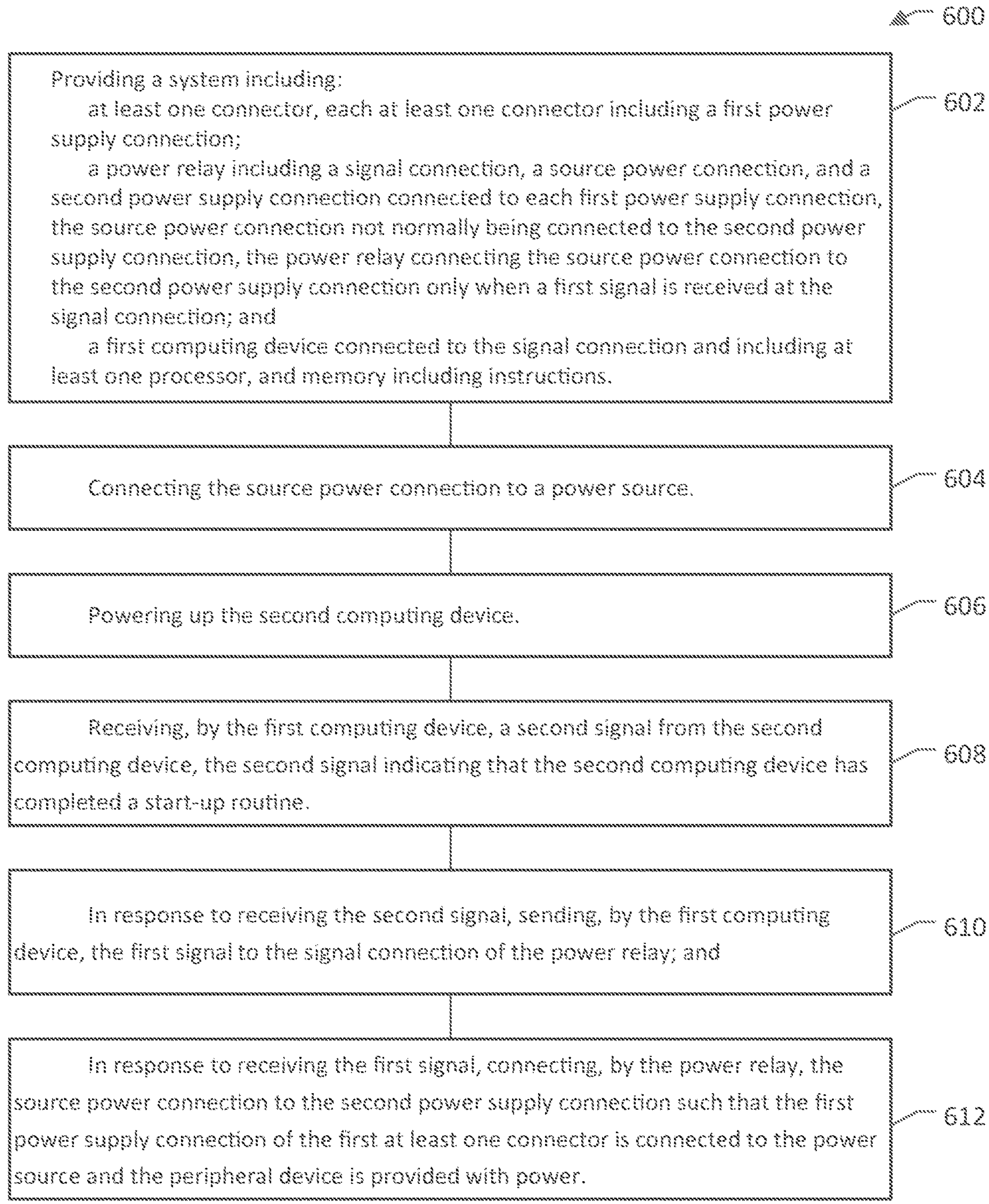
FIG. 6 is a flow chart of an embodiment of a method for using an embodiment of a power management system.

FIG. 6 is a flow chart of an embodiment of a method 600 for using an embodiment of a power management system to power a peripheral device. In FIG. 6, method 600 includes, in a step 602: providing a system including: at least one connector, each at least one connector including a first power supply connection; a power relay including a signal connection, a source power connection, and a second power supply connection connected to each first power supply connection, the source power connection not normally being connected to the second power supply connection, the power relay connecting the source power connection to the second power supply connection only when a first signal is received at the signal connection; and a first computing device connected to the signal connection and including at least one processor, and memory including instructions. A step 604 includes: connecting the source power connection to a power source. A step 606 includes: powering up the second computing device. A step 608 includes: receiving, by the first computing device, a second signal from the second computing device, the second signal indicating that the second computing device has completed a start-up routine. A step 610 includes: in response to receiving the second signal, sending, by the first computing device, the first signal to the signal connection of the power relay. And a step 612 includes: in response to receiving the first signal, connecting, by the power relay, the source power connection to the second power supply connection such that the first power supply connection of the first at least one connector is connected to the power source and the peripheral device is provided with power.

In this description, embodiments have been described with reference to a connection, including a USB port and USB hub, between a computing device and a USB device; however, it should be recognized that the teachings of this disclosure may be applied to other types of connections and devices without departing from the teachings of this disclosure.

Figure 7:
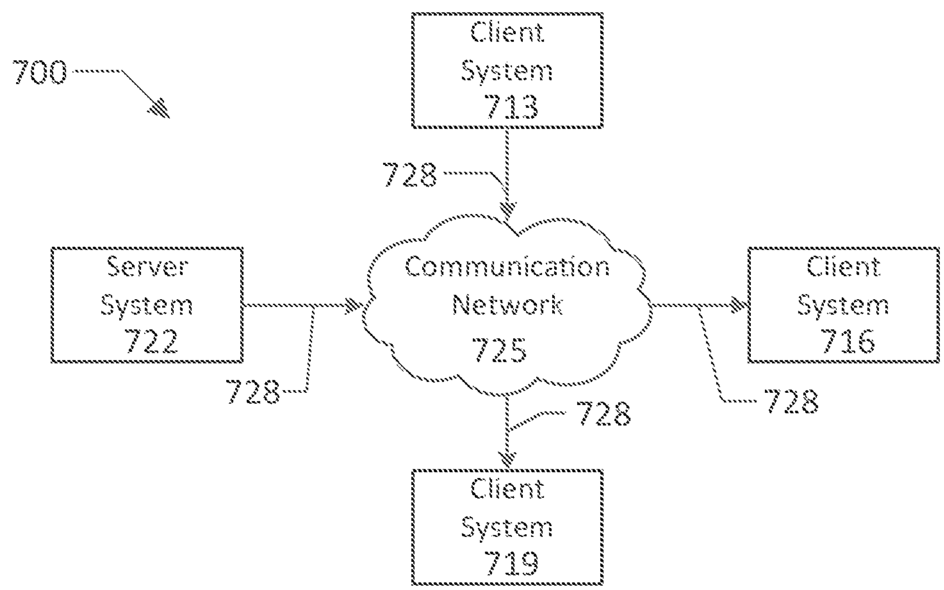
FIG. 7 is a simplified block diagram of a distributed computer network for practicing an embodiment of a power management system.

FIG. 7 is an exemplary block diagram depicting an embodiment of system 700 for implement embodiments of methods of the disclosure, e.g., as described with reference to the previous figures, and particularly elements 120 and 150. In FIG. 7, communication network 725 includes a number of client systems 713, 716, 719, and one or more server systems 722 coupled to a communication network 725 via a plurality of communication links 728. Communication network 725 provides a mechanism for allowing the various components of distributed system 700 to communicate and exchange information with each other. Thus, FIG. 7 describes systems for implementing elements 120 and 150.

Communication network 725 itself is comprised of one or more interconnected computer systems and communication links. Communication links 728 may include hardwire links, optical links, satellite or other wireless communications links, wave propagation links, or any other mechanisms for communication of information. Various communication protocols may be used to facilitate communication between the various systems shown in FIG. 7. These communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols, Internet telephony, IP telephony, digital voice, voice over broadband (VoBB), broadband telephony, Voice over IP (VoIP), vendor-specific protocols, customized protocols, and others. While in one embodiment, communication network 725 is the Internet, in other embodiments, communication network 725 may be any suitable communication network including a local area network (LAN), a wide area network (WAN), a wireless network, a cellular network, a personal area network, an intranet, a private network, a near field communications (NFC) network, a public network, a switched network, a peer-to-peer network, and combinations of these, and the like.

In an embodiment, the server 722 is not located near a user of a computing device, and is communicated with over a network. In a different embodiment, the server 722 is a device that a user can carry upon his person, or can keep nearby. In an embodiment, the server 722 has a large battery to power long distance communications networks such as a cell network (LTE, 5G), or Wi-Fi. The server 722 communicates with the other components of the system via wired links or via low powered short-range wireless communications such as Bluetooth®. In an embodiment, one of the other components of the system plays the role of the server, e.g., the PC 2310*b*.

Distributed computer system 700 in FIG. 7 is merely illustrative of an embodiment incorporating the embodiments and does not limit the scope of the embodiments as recited in the claims. One of ordinary skill in the art would recognize other variations, modifications, and alternatives. For example, more than one server system 722 may be connected to communication network 725. As another example, a number of computing devices 713, 716, 719 may be coupled to communication network 725 via an access provider (not shown) or via some other server system.

Computing devices 713, 716, 719 typically request information from a server system that provides the information. Server systems by definition typically have more computing and storage capacity than these computing devices, which are often such things as portable devices, mobile communications devices, or other computing devices that play the role of a client in a client-server operation. However, a particular computing device may act as both a client and a server depending on whether the computing device is requesting or providing information. Aspects of the embodiments may be embodied using a client-server environment or a cloud-cloud computing environment.

Server 722 is responsible for receiving information requests from computing devices 713, 716, 719, for performing processing required to satisfy the requests, and for forwarding the results corresponding to the requests back to the requesting computing device. The processing required to satisfy the request may be performed by server system 722 or may alternatively be delegated to other servers connected to communication network 725 or to other communications networks. A server 722 may be located near the computing devices 713, 716, 719 or may be remote from the computing devices 713, 716, 719. A server 722 may be a hub controlling a local enclave of things in an internet of things scenario.

Computing devices 713, 716, 719 enable users to access and query information or applications stored by server system 722. Some example computing devices include portable electronic devices (e.g., mobile communications devices) such as the Apple iPhone®, the Apple iPad®, the Palm Pre™, or any computing device running the Apple iOS™, Android™ OS, Google Chrome OS, Symbian OS®, Windows 10, Windows Mobile® OS, Palm OS® or Palm Web OS™, or any of various operating systems used for Internet of Things (IoT) devices or automotive or other vehicles or Real Time Operating Systems (RTOS), such as the RIOT OS, Windows 10 for IoT, WindRiver VxWorks, Google Brillo, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used. In a specific embodiment, a "web browser" application executing on a computing device enables users to select, access, retrieve, or query information and/or applications stored by server system 722. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 8:
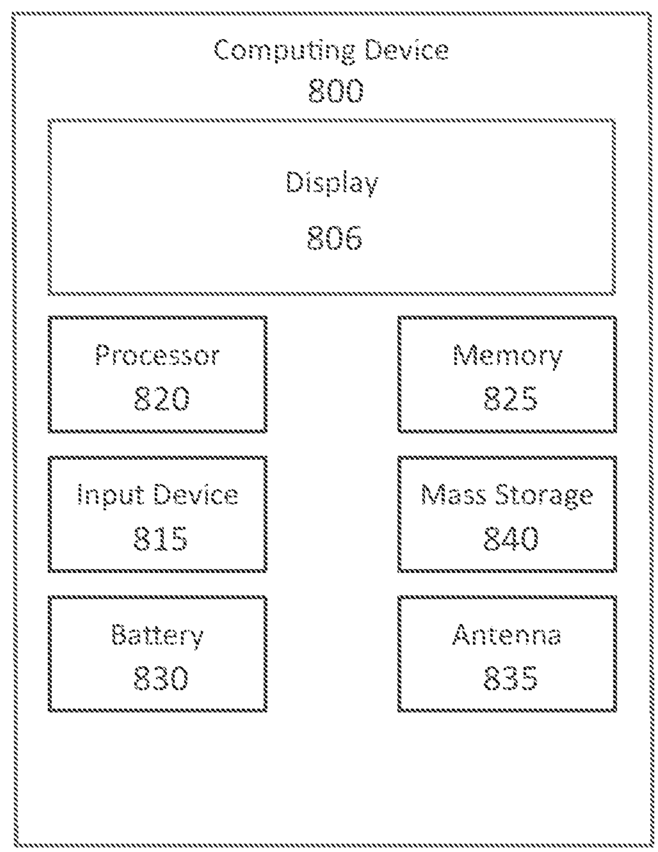
FIG. 8 shows an exemplary computer system such as a computing device in an embodiment of a power management system.

FIG. 8 is an exemplary block diagram depicting a computing device 800 of an embodiment. Computing device 800 may be any of the computing devices 713, 716, 719, 722 from FIG. 7. Computing device 800 may include a display, screen, or monitor 806, housing 810, and input device 815. Housing 810 houses familiar computer components, some of which are not shown, such as a processor 820, memory 825, battery 830, speaker, transceiver, antenna 835, microphone, ports, jacks, connectors, camera, input/output (I/O) controller, display adapter, network interface, mass storage devices 840, various sensors, and the like.

Input device 815 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 840 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, SD cards, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems, and may include systems provided by Arduino, or Raspberry Pi. For example, a computer system could include more than one processor (i.e., a multiprocessor system, which may permit parallel processing of information) or a system may include a cache memory. The computer system shown in FIG. 8 is but an example of a computer system suitable for use with the embodiments. Other configurations of subsystems suitable for use with the embodiments will be readily apparent to one of ordinary skill in the art. For example, in a specific implementation, the computing device is a mobile communications device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the embodiments may be embodied using, stored on, or associated with computer-readable medium. A computer-readable medium may include any medium that participates in providing instructions to one or more processors for execution, such as memory 825 or mass storage 840. Such a medium may take many forms including, but not limited to, nonvolatile, volatile, transmission, non-printed, and printed media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the embodiments may be stored or reside in RAM or cache memory, or on mass storage device 840. The source code of this software may also be stored or reside on mass storage device 840 (e.g., flash drive, hard disk, magnetic disk, tape, or CD-ROM). As a further example, code useful for practicing the embodiments may be transmitted via wires, radio waves, or through a network such as the Internet. In another specific embodiment, a computer program product including a variety of software program code to implement features of the embodiment is provided.

Computer software products may be written in any of various suitable programming languages, such as C, C++, C #, Pascal, Fortran, Perl, Matlab (from Math Works, www.mathworks.com), SAS, SPSS, JavaScript, CoffeeScript, Objective-C, Swift, Objective-J, Ruby, Rust, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, Bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 10 or other Windows versions, Windows CE, Windows Mobile, Windows Phone, Windows 10 Mobile), Linux, HP-UX, UNIX, Sun OS, Solaris, Mac OS X, Alpha OS, AIX, IRIX32, or IRIX64, or any of various operating systems used for Internet of Things (IoT) devices or automotive or other vehicles or Real Time Operating Systems (RTOS), such as the RIOT OS, Windows 10 for IoT, WindRiver VxWorks, Google Brillo, ARM Mbed OS, Embedded Apple IOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium µC/OS-II, Micrium µC/OS-III, Windows CE, TI-RTOS, RTEMS. Other operating systems may be used.

Furthermore, the computer may be connected to a network and may interface to other computers using this network. The network may be an intranet, internet, or the Internet, among others. The network may be a wired network (e.g., using copper, and connections such as RS232 connectors), telephone network, packet network, an optical network (e.g., using optical fiber), or a wireless network, or any combination of these. For example, data and other information may be passed between the computer and components (or steps) of a system useful in practicing the embodiments using a wireless network employing a protocol such as Wi-Fi (IEEE standards 802.11, 802.11a, 802.11b, 802.11e, 802.11g, 802.11i, and 802.11n, just to name a few examples), or other protocols, such as BLUETOOTH or NFC or 802.15 or cellular, or communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols or the like. For example, signals from a computer may be transferred, at least in part, wirelessly to components or other computers.

While the embodiments have been described with regards to particular embodiments, it is recognized that additional variations may be devised without departing from the inventive concept.

FIG. 6 shows an overall flow 600 of a specific implementation of the system. Elsewhere within specific flows may be presented in this application, but it should be understood that the inventive subject matter is not limited to the specific flows and steps presented. A flow of may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular application or based on the data.

The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

What is claimed is:

1. A system including:

at least one connector, each at least one connector including a first power supply connection;

a power relay including a first signal connection, a source power connection, and a second power supply connection connected to each first power supply connection, the source power connection not normally being connected to the second power supply connection, the power relay connecting the source power connection to the second power supply connection only when a first signal is received at the first signal connection;

a first computing device connected to the first signal connection and including at least one processor and memory including instructions that, when executed by the processor, cause the system to perform actions including, when the first computing device is connected to a second computing device and the source power connection is connected to a power source:

receiving a second signal from the second computing device, the second signal indicating that the second computing device has completed a start-up routine; and in response to receiving the second signal, sending the first signal to the first signal connection of the power relay, wherein: the power relay, upon receipt of the first signal, connects the source power connection to the second power supply connection such that the first power supply connection of each at least one connector is connected to the power source.

2. The system of claim 1, wherein each at least one connector is a USB port within a USB hub.

3. The system of claim 1, wherein the first computing device is a microcontroller.

4. The system of claim 1, wherein the first computing device is connected to the second computing device by a second signal connection between USB com ports on the first and second communications devices.

5. The system of claim 1, wherein the first signal includes a command.

6. The system of claim 1, wherein the power source is a 12 VDC power source.

7. The system of claim 1, wherein the actions further include: sending to the second computing device an acknowledgement of receiving the second signal.

8. A method of powering a peripheral device, the method including:

providing a system including:

at least one connector, each at least one connector including a first power supply connection;

a power relay including a first signal connection, a source power connection, and a second power supply connection connected to each first power supply connection, the source power connection not normally being connected to the second power supply connection, the power relay connecting the source power connection to the second power supply connection only when a first signal is received at the first signal connection; and a first computing device connected to the first signal connection and including at least one processor, and memory including instructions;

connecting the source power connection to a power source;

connecting the first computing device to a second computing device;

connecting the peripheral device to a first at least one connector;

powering up the second computing device;

receiving, by the first computing device, a second signal from the second computing device, the second signal indicating that the second computing device has completed a start-up routine;

in response to receiving the second signal, sending, by the first computing device, the first signal to the first signal connection of the power relay; and in response to receiving the first signal, connecting, by the power relay, the source power connection to the second power supply connection such that the first power supply connection of the first at least one connector is connected to the power source and the peripheral device is provided with power.

9. The method of claim 8, wherein the at least one connector includes a USB connector and the peripheral device includes a USB drive.

10. The method of claim 8, wherein the first computing device is a microcontroller.

11. The method of claim 8, wherein the first computing device is connected to the second computing device by a second signal connection between USB com ports on the first and second communications devices.

12. The method of claim 8, wherein the first signal includes a command.

13. The method of claim 8, wherein the power source is a 12 VDC power source.

14. The method of claim 8, further comprising sending to the second computing device an acknowledgement of receiving the second signal.

15. A non-transitory computer-readable medium comprising instructions that when executed by a processor of a first computing device cause the first computing device to perform actions including:

receiving a second signal from the second computing device, the second signal indicating that the second computing device has completed a start-up routine;

in response to receiving the second signal, sending a first signal to a first signal connection of a power relay, wherein:

the power relay, upon receipt of the first signal, connects a source power connection to a second power supply connection such that, for at least one connector, a first power supply connection of the at least one connector is connected to the source power connection through the second power supply connection.

16. The non-transitory computer-readable medium of claim 15, wherein the at least one connector includes a USB connector and the peripheral device includes a USB drive.

17. The non-transitory computer-readable medium of claim 15, wherein the first computing device is a microcontroller.

18. The non-transitory computer-readable medium of claim 15, wherein the first computing device is connected to the second computing device by a second signal connection between USB com ports on the first and second communications devices.

19. The non-transitory computer-readable medium of claim 15, wherein the first signal includes a command.

20. The non-transitory computer-readable medium of claim 15, the actions further comprising sending to the second computing device an acknowledgement of receiving the second signal.

* * * * *